United States Patent [19]

McDermott

[11] Patent Number: 4,963,798
[45] Date of Patent: Oct. 16, 1990

[54] SYNTHESIZED LIGHTING DEVICE

[76] Inventor: Kevin McDermott, 196 Phillips Dr., Hampstead, Md. 21074

[21] Appl. No.: 312,480

[22] Filed: Feb. 21, 1989

[51] Int. Cl.$^5$ .................... H05B 37/02; H05B 37/00; F21V 23/00

[52] U.S. Cl. .................... 315/312; 315/192; 362/240; 362/231; 362/227; 362/800

[58] Field of Search ............ 362/240, 800, 801, 231, 362/227; 315/312, 179, 192

[56] References Cited

U.S. PATENT DOCUMENTS 4,677,533 6/1987 McDermott et al. ............ 362/240

Primary Examiner—Eugene R. LaRoche
Assistant Examiner—Ali Neyzari
Attorney, Agent, or Firm—Eugene F. Osborne, Sr.

[57] ABSTRACT

Lighting devices for portable and fixed applications use two or more light sources having differing spectral colors and electrical circuit parameters to shape spectral energy distributions of beams of illumination for projection upon external objects and surfaces so as to enhance an observer's perception and discrimination of information displayed thereon, while reducing the radiation of inefficient energies at undesired color spectra. Electrical parameters of the differing light sources are used in sensitive circuits to monitor the condition of battery power and to automatically extend the range of effective illumination produced as the applied power degrades.

25 Claims, 3 Drawing Sheets

SYNTHESIZED LIGHTING DEVICE

BACKGROUND OF THE INVENTION

1. Field of the Invention

This invention in the preferred embodiment relates to a lighting device which emits a light that is used for illumination and color discrimination when it is projected on an external surface. It performs these tasks throughout a range of power and with a minimum of infrared emissions. More specifically, the invention relates to a lighting device which synthesizes its projected radiant energy from two or more light sources of differing spectral distributions. It uses the characteristics of the different light sources to interact photometrically and/or electrically to create an emitted beam of light which provides color discrimination over an extended range of powers. Other features of the invention include improved efficiency and power condition monitoring. The invention has application in devices energized by either power lines or batteries.

2. Related Art

Lighting devices which are used to illuminate are also frequently required to provide color discrimination when they are projected upon multicolored surfaces. White light is the most commonly used because white provides color discrimination for all of the colors of the spectrum. However, spectral distributions other than white may also find application in situations where limited color discrimination is acceptable. Lighting devices of this nature are frequently dimmed and when that feature is provided, it is desirable that the device maintain its ability to accurately discriminate between the required colors throughout the full required range of dimming of the emitted illumination. It is also desirable that a single control effect the dimming while minimizing changes in the discrimination of colors.

The invention provides a lighting device that combines lamp sources for color discrimination and also retains the color discrimination as the device is dimmed.

Lighting fixture U.S. Pat. No. 4,677,533 (McDermott) is typical of an invention that synthesizes a projected light beam from light sources of differing spectral distributions. This prior art creates the color balance by the adjustment of several potentiometers and does not use the electrical/electronic characteristics of the lamps to maintain the proper spectral distribution when a reduction of power occurs.

Incandescent lamps are traditionally used for this type of lighting device but they are not adequate as they experience dramatic changes in the color of the projected light as the power consumed by the lamp is decreased. They are also inadequate because they can provide only a limited spectral distribution. A related invention is disclosed in U.S. application Ser. No. 07/208,218, now pending.

SUMMARY OF THE INVENTION

The present invention comprises electrical circuits having multiple lamp sources of electronic, incandescent, gas discharge or other designs. Some embodiments require an optical filter to be used with a particular lamp to obtain required spectral emissions. The circuitry is designed such that changes in available power can be imposed upon the lighting device without severely changing the synthesized spectral radiation projected from the device.

One objective of the present invention is to provide a lighting device which emits light which is synthesized by efficiently combining the radiant energies from light sources having spectral emissions at median wavelengths differing by at least 40 nanometers and in so doing improve the color perception provided by the projected light.

Another object of this invention is to improve its efficiency by using the electrical/electronic photometric characteristics of the multiple light sources to interact to maintain the color discriminating properties of its synthesized radiant energies throughout a range of power consumption.

Another object of this invention is to provide a lighting device which maintains its synthesized color regardless of whether the available power is reduced accidentally or deliberately by a power reducing control.

Another object of this invention is to extend the low voltage operating range of the lighting device.

Another object of this invention is to place the filament of an incandescent lamp in series with a light emitting diode and in so doing use the resistance of the incandescent lamp filament as a current limiting resistor to protect the light emitting diode from excessive current.

Another object of this invention is to improve the efficiency of the lighting device by constructively using the energy normally wasted in the current limiting resistor or other circuit elements to create useful light.

Another object of this invention is to provide an electrical circuit which maintains or increases the relative energy consumed by a light emitting diode as the total energy consumed by a series circuit containing that diode and another lamp—such as an incandescent lamp—is decreased.

Another object of this invention is to provide a lighting device which continues to operate even if one lamp fails.

Another object of this invention is to visually indicate when a reduction in power has occurred by a change in color of the synthesized light.

Another object of this invention is to increase its efficiency by constructively using the photometric emissions of the power condition indicator to increase the intensity of the projected light.

Still another object of this invention is to provide a discrete visible indication that the batteries are low when the battery powered embodiment is incorporated.

Other objects, features, and advantages will become apparent from the description in connection with the accompanying drawings of the presently preferred embodiments of the invention.

BRIEF DESCRIPTION OF THE DRAWINGS

The invention is described with reference to accompanying drawings, in which.

DETAILED DESCRIPTION

Figure 1:
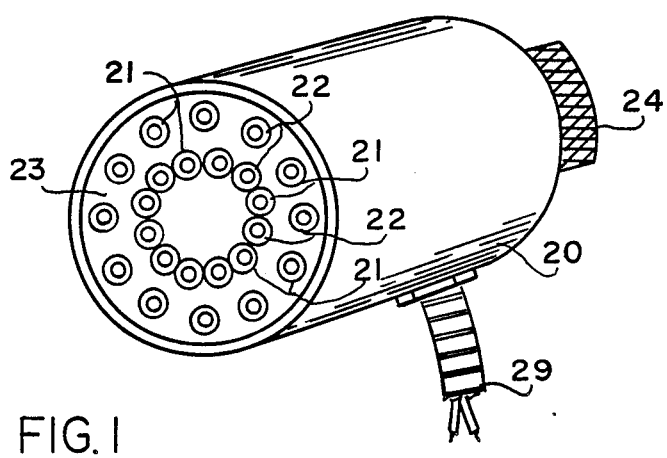
FIG. 1 is a perspective view of a red-green light emitting diode (LED) synthesized light for maintenance applications.
Figure 2:
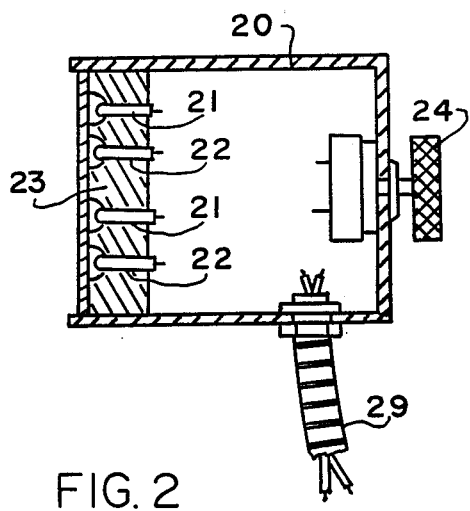
FIG. 2 is a sectional view in a plane bisecting the longitudinal axis of the maintenance lamp of FIG. 1.
Figure 4:
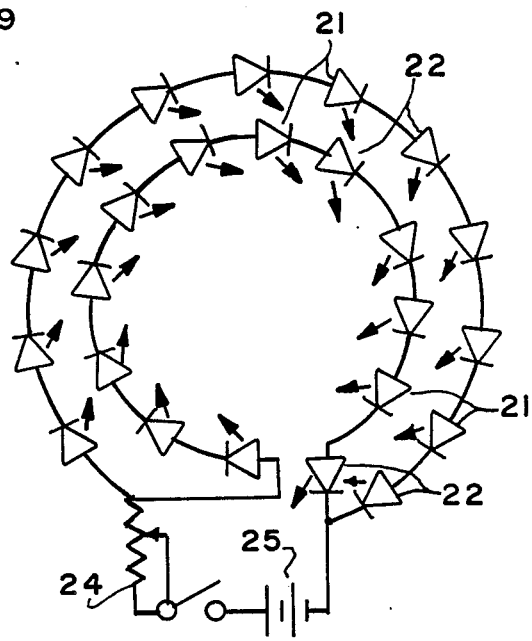
FIG. 4 is a series network diagram of a red-green array of LEDs.
Figure 3:
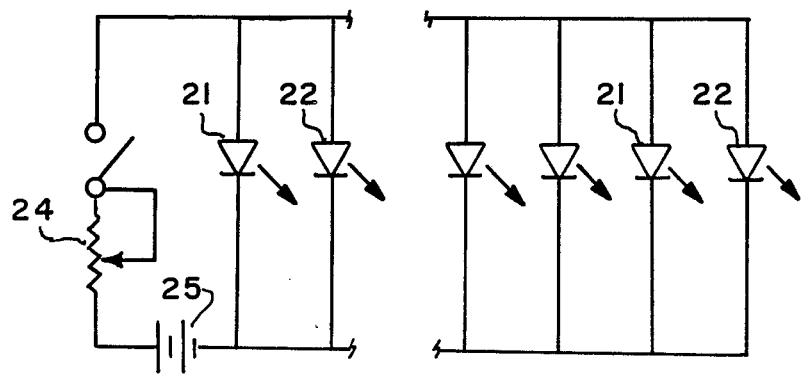
FIG. 3 is a parallel network diagram of a red-green array of LEDs.

For discussions relating to this invention, the median wavelength of the visual spectral distribution is hereby defined as the wavelength which divides the total radiant energy emitted from the synthesizer during a typical one second period of operation that is within the bandwidth between 380 and 740 nanometers in half. Therefore, the total radiant energy emitted between 380 nanometers and the median wavelength is equal to the total radiant energy emitted between the median wavelength and 740 nanometers. Continuing with reference to the drawings:

One embodiment, FIGS. 1-2, of this invention comprises red 21 and green 22 light emitting diodes mounted sequentially on an array 23 of a reading lamp 20 such that the emitted energies mix and synthesize a whitish color. The diodes 21, 22 are available in optional light diffusing and non-diffusing packages. If the light emitting diodes 21 and 22 are in parallel, FIG. 3, and the device is dimmed by reducing the voltage across the lamps using the combined switch-rheostat 24, the green light emitting diodes 22 will turn off before the red light emitting diodes 21 causing a drastic change in color for low intensities. A battery 25 or equivalent power supply provides electrical energy. By designing the circuit so the different color lamps 21, 22 are in series, FIG. 4, the current is uniform through all the diode lamps 21, 22 and they all remain on until the power is reduced below threshold at which point they all extinguish almost simultaneously. This invention maintains the synthesized color even at lower intensity levels by maintaining the relative power consumed by the green and red light emitting diodes as the total power to all the lamps is decreased.

Also as the power is increased the intensity of the diode illumination increases approximately proportionally and this characteristic combined with their stable color reduces color changes in the synthesized light.

Figure 5:
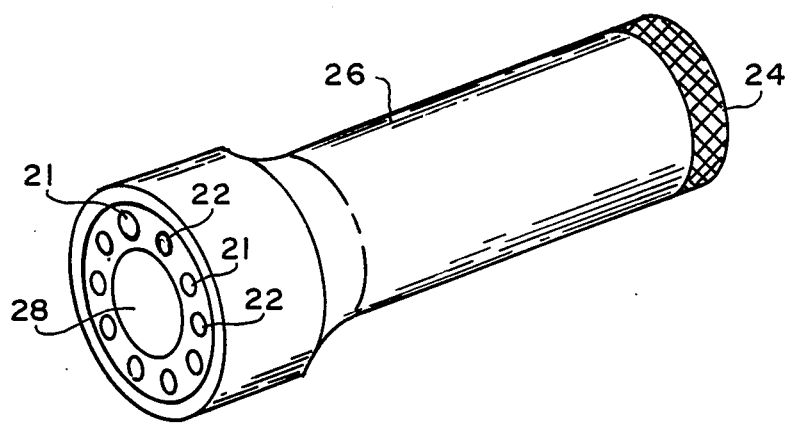
FIG. 5 is a perspective view of a synthesized lighting device comprising an incandescent lamp and LEDs.
Figure 6:
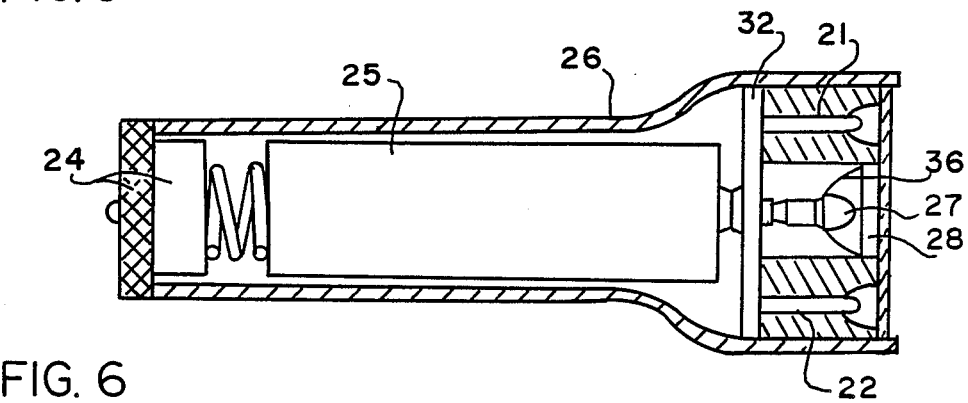
FIG. 6 is a sectional view along the longitudinal axis of the device of FIG. 5.

Another embodiment, FIG. 5-6, illustrating a portable flashlight 26 consists of the synthesized radiant energies of an incandescent lamp 27 and one or more light emitting red 21 or green 22 diodes. In this configuration, the device may be deliberately dimmed using a rheostat 24 or inadvertently dimmed through a drop in battery 25 voltage or power line voltage. In either instance, it is desirable that the synthesized color be maintained throughout the widest range of possible voltages. The incandescent lamp 27 does not have a discrete "off" voltage like the light emitting diode lamps 21, 22. If the green or red light emitting diodes 21, 22 turn off the synthesized light will exhibit a drastic change in color when dimmed. The present invention, FIG. 7, corrects this deficiency by placing at least one light emitting diode lamp 21 or 22 in series with the incandescent lamp 27. As the power is reduced, the incandescent lamp 27 prevents the light emitting diode lamps 21, 22 from turning off by reducing its resistance and shifting a larger percentage of the total power consumed by the series circuit to the light emitting diode lamps 21, 22. An optical filter 28 is in the exit aperture 29 of the array 23. This optional optical filter 28 can be used to absorb infrared and/or visible energy of one or more lamps so that the filtered lamp will provide a spectral emission that achieves the color discriminating objectives of a particular design. One such design, FIG. 6, uses an incandescent lamp 27 with a bluish infrared absorbing filter 28 in combination with non-filtered red 21 and green 22 light emitting diodes. Such a design would synthesize a white light with almost no infrared emissions. Also, the filter element 28 may be designed to provide blending of the emitted light. Alternatively, a reflector 36 with synthesizing optics may be provided for the incandescent lamp 27.

Figure 7:
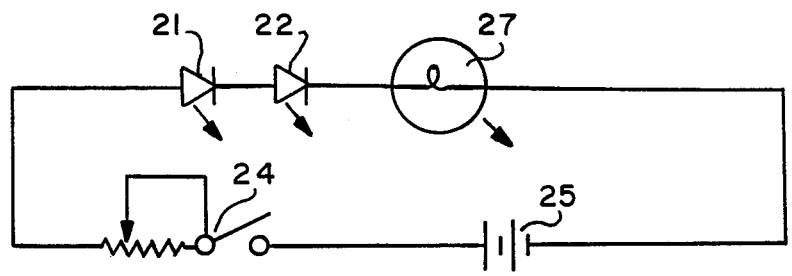
FIG. 7 is a series network diagram for a combination of an incandescent lamp with LEDs.

In configurations requiring more than one color light emitting diode to be mixed with the incandescent 27, the full benefit of the invention is realized by placing at least one of each color type light emitting diode 21, 22 in the series circuit, FIG. 7, which includes the incandescent lamp 27.

Figure 8:
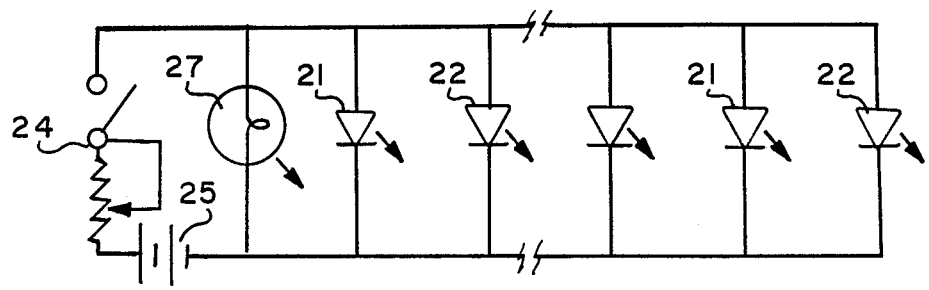
FIG. 8 is a parallel network diagram for a combination of an incandescent lamp with LEDs.

In other applications the light emitting diode lamps 21, 22 can be placed in a parallel circuit, FIG. 8. In this parallel embodiment as the voltage across the lamps drops, the lamps of one color—such as green will turn off before lamps of a second color—such as red and the synthesized light will exhibit a discrete change in color. This color change can be an effective indication of depleted batteries in battery 25 operated devices and warn of low voltage in line 29 powered lights, FIGS. 1-2.

Figure 9:
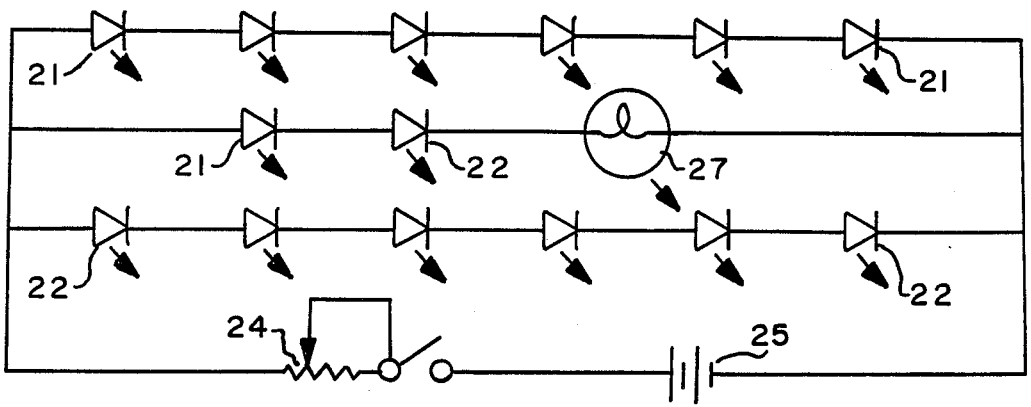
FIG. 9 is a network diagram of parallel branches of an incandescent lamp—red LEDs and green LEDs.

Another embodiment of this invention uses at least two series circuits, FIG. 9, of one or more lamps to create the synthesized light.

Figure 10:
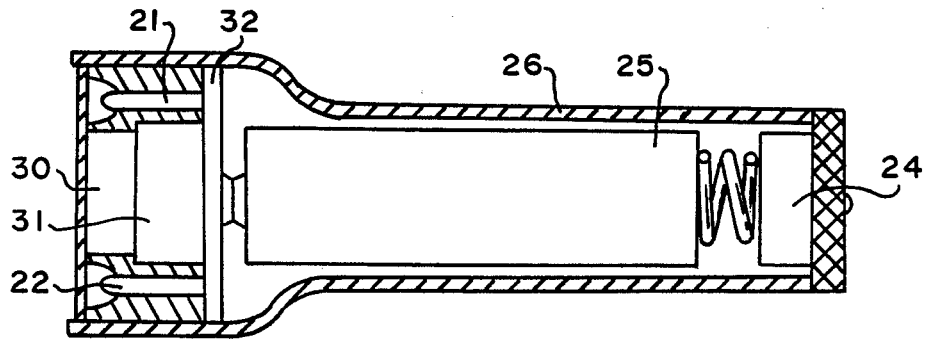
FIG. 10 is a sectional longitudinal axis view of a synthesized lighting device comprising electroluminescent and LED lamps.
Figure 11:
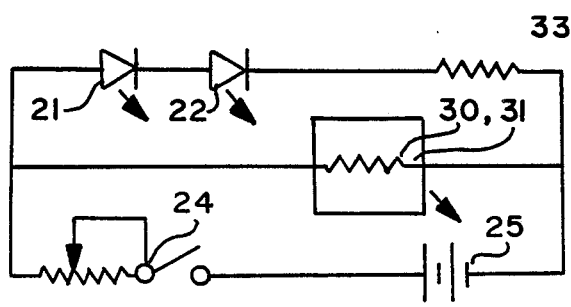
FIG. 11 is a network diagram for a lighting synthesizer comprising electroluminescent and LED lamps.

A portable flashlight 26 is illustrated in FIG. 10 having an electroluminescent lamp 30 and driver circuit 31 in combination with one or more light emitting diodes such as the red and green light emitting diodes 21, 22. The light emitting diodes 21, 22 may be used to indicate the status of the power source 25 as well as to supplement the color of the emitted light. The circuit for the electroluminescent lamp established through the wiring board 32 is illustrated in FIG. 11. An optional current limiting resistor 33 is in series with the light emitting diodes 21, 22.

Figure 12:
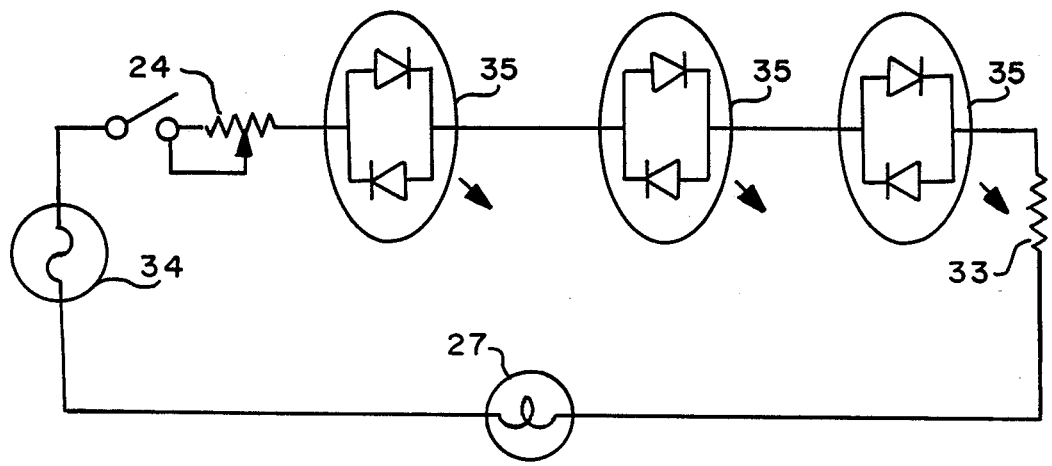
FIG. 12 is a network diagram for an alternating current LED lighting synthesizer.

In some applications requiring a synthesized spectrum of visible (light) energy there may be alternating current sources of prime power. The mechanical configurations may be adapted to alternating rather than direct current power sources as illustrated by the network diagram of FIG. 12 wherein the alternating current from the line or generator 34 is applied through the switch-rheostat to the respective light transducers. The incandescent lamp 27 is shown in series with bi-color or tristate light emitting diodes 35 and an optional current limiting resistor 33. Within the envelope of each bi-color or tristate diode 35, for example, red and green light emitting junctions are arranged back-to-back for full wave light emission—the red junctions on one half cycle and the green junctions on the other half cycle of the alternating current. If the frequency of the alternating current is high enough the human eye perceives only the synthesized color rather than the red and green components. Alternatively the junctions could be arranged to emit both red and green colors on each half cycle. For either configuration the synthesized color when used to illuminate exterior multicolored surfaces provides superior color perception. Being within the single envelope of the tristate or bi-color diode 35 superior mixing of the respective colors of light is an advantage achievable with the alternating current power sources. Obviously separate light emitting diodes, 21, 22 may be likewise connected in a similar circuit, however, they would lack the advantage of the common envelope.

Synthesized lighting devices may be constructed and operated with other than red and green light emitting diodes and the placement and the numbers of each color may vary for specific applications.

Some applications may find it beneficial to place several diode junctions within a single package. In this instance, the use of the word diode, lamp or emitter within the claims should—when applicable—apply to each junction. Hence a single package could include several lamps or emitters.

This invention may be embodied in other specific forms without deviating from its concepts or essential characteristics. The embodiment disclosed is therefore to be considered in all respects as illustrative and not limiting, the scope of the invention being indicated by the appending claims.

Having described the invention, I claim:

1. A lighting device, supplied with electrical power, for illumination and improved color perception by an observer of external surfaces, which comprises:
    (a) a first subassembly comprising at least one lamp for emitting a first beam of photometric energy of a first spectral distribution and a first median wavelength which remains relatively stable over a given range of said power;
    (b) a second subassembly comprising at least one lamp for emitting a second beam of photometric energy of a second spectral distribution with a second median wavelength which remains relatively stable over said given range of power and that differs from that of said first median wavelength;
    (c) means to combine and project said first and second beams of photometric energy from said lighting device such that when the composite energies are used to illuminate an external surface said composite energies are perceived by said observer as a synthesized third spectral distribution with a median wavelength differing from both said first and said second median wavelengths; and
    (d) means for an automatic diminishment of shifts of said median wavelength of said synthesized composite energies resulting from disproportionate changes in the photometric energies emitted by said first and second subassemblies initiated by changes in power consumed by said lighting device due to variations of said supply of electrical power by degradation and voluntary adjustments.

2. A lighting device, as recited in claim 1, where said means for automatic diminishment of said median wavelength shifts of said third spectral distribution comprise:
    (a) said first subassembly comprising at least one lamp that emits photometric energy which changes a given proportional amount in response to a given variation in said electrical power consumed by said lighting device; and
    (b) said second subassembly comprising at least one lamp that emits photometric energy which changes a proportional amount similar in size to the change exhibited by said first subassembly due to said same given variation in electrical power consumed by said lighting device.

3. A lighting device, as recited in claim 2, wherein said lamps that emit substantially proportional intensities of light energies in response to said variation of electrical power, further comprise:
    (a) an electroluminescent lamp for emitting said first spectral distribution of light energies; and
    (b) at least one light emitting diode for emitting said second spectral distribution of light energies.

4. A lighting device, as recited in claim 2, wherein said lamps that emit substantially proportional intensities of light energies in response to said variation of electrical power, further comprise:
    (a) at least one light emitting diode for emitting said first spectral distribution of light energies in a first limited band of wavelengths; and
    (b) at least one light emitting diode for emitting said second spectral distribution of light energies in a second limited band of wavelengths.

5. A lighting device, as recited in claim 4, wherein said light emitting diodes, further comprise:
    (a) at least one light emitting diode responsive to applied electrical power for said emission of light energies in a limited band of wavelengths centered about a visible red color; and
    (b) at least one light emitting diode responsive to said applied electrical power for said emission of light energies in a limited band of wavelengths centered about a green color.

6. A lighting device, as recited in claim 1, wherein said first subassembly comprises:
    (a) at least one broad spectral light emitter that radiates energies at undesired wavelengths; and
    (b) at least one optical filter interposed between said broad spectral light emitter and said exit aperture of said lighting device for the attenuation of spectral energies emitted at wavelengths outside a specified band of desired wavelengths.

7. A lighting device, as recited in claim 6, wherein said broad spectral light emitter comprises:
    (a) an incandescent lamp.

8. A lighting device, as recited in claim 1, wherein said means for automatic diminishment of shifts of said median wavelength of said third spectral distribution comprise:
    (a) at least one of said first and second subassemblies of lamps further comprising at least one first light emitter which has a characteristic internal resistance that is a function of applied power in at least a limited range of said applied power;
    (b) at least one of said first and second subassemblies of lamps still further comprising at least one second light emitter which has a characteristic internal resistance that differs, in said limited range of applied power, from said characteristic resistance of said first emitter; and
    (c) a circuit network, for said lamps of said first and second subassemblies of lamps, that automatically effects a division of the proportional powers consumed by said first and second light emitters to extend the range of said applied power in which said median wavelength of said third spectral distribution is relatively stable, said division of power consumption being automatically responsive to said changes in the internal resistance of said first light emitter.

9. A lighting device, as recited in claim 8, wherein said first and second light emitters comprise:
(a) at least one incandescent lamp for said variable resistance that is a function of applied power; and
(b) at least one light emitting diode having a characteristic resistance differing from the impedance of said incandescent lamp.

10. A lighting device, as recited in claim 8, wherein said circuit network comprises:
(a) an electrical connection of said first and second light emitters in series arrangement.

11. A lighting device, as recited in claim 1, wherein said means for automatic diminishment of shifts of said median wavelength of said third spectral distribution comprises at least two complimentary combinations, comprising:
(a) a first combination of a group of spectral light emitters, for inclusion in said first or second subassemblies of lamps, for radiating energies in the respective spectral distributions at intensity levels proportional to applied voltage or current in response to variations of said electrical power above the respective thresholds of emission of said spectral emitters;
(b) a second combination, comprising:
  at least one of said first or second subassemblies of lamps further comprising one broad spectral light emitter that radiates excess energies at undesired wavelengths; and
  at least one optical filter, interposed between said broad spectral light emitter and said exit aperture of said lighting device, for the attenuation of undesirable spectral energies leaving a preferred spectral distribution as said first or said second spectral distribution;
(c) a third combination, comprising:
  at least one of said first and second subassemblies of lamps further comprising at least one first light emitter which has a characteristic internal resistance and an intensity of light emission that are functions of applied power in a limited range of said applied power;
  at least one of said first and second subassemblies of lamps still further comprising at least one second light emitter which has a characteristic internal resistance and an intensity of light emission that differ, in said limited range of applied power, from said resistance and light emission of said first emitter; and
  a circuit network, for said emitters and said electrical power supply, that automatically effects a division of the proportional powers consumed by said first and second light emitters to establish a range of applied total circuit power in which said median wavelength is relatively stable; said division of power consumption being automatically responsive to said changes in internal resistance of said first or said second light emitter; and
(d) a fourth combination, comprising:
  at least one lamp for said first spectral distribution of photometric energy having a threshold of light emission at a first power level;
  at least one lamp for said second spectral distribution of photometric energy having a threshold of light emission at a second power level differing from said first power level; and
  a circuit network, of said lamps and said electrical power, that automatically effects a single total circuit power threshold for almost simultaneous light emission from both lamps.

12. A lighting device, supplied with electrical power, for the illumination and improved color perception by an observer of external surfaces, which comprises:
(a) a first subassembly comprising at least one lamp for emitting photometric energy in a first distribution of spectral wavelengths with a first median wavelength;
(b) a second subassembly comprising at least one lamp for emitting photometric energy in a second distribution of spectral wavelengths and a second median wavelength that differs from said first median wavelength by at least 40 nanometers;
(c) a circuit of interconnections of said lamps of said first and second subassemblies with said supply of electrical power; and
(d) a synthesizer, controlling said photometric energy emissions of said first and second subassemblies, for the formation of a composite illumination of a third spectral distribution and third median wavelength for radiation from an exit aperture of said lighting device.

13. A lighting device, as recited in claim 12, wherein said synthesizer comprises:
(a) an optical lens for placement between at least one of said subassemblies and said exit aperture.

14. A lighting device, as recited in claim 12, wherein said synthesizer comprises:
(a) an optical reflector for at least one of said subassemblies.

15. A lighting device with a monitor for the condition of batteries and line supplies of electrical power, which comprises:
(a) a first light emitter operative at a first spectral color of the visible wavelengths for levels of said electrical power exceeding a first threshold for light emission;
(b) a second light emitter operative at a second spectral color of the visible wavelengths for levels of said electrical power exceeding a second threshold for light emission;
(c) an electrical circuit comprising:
  said first light emitter operative when the applied power exceeds said first power threshold; and
  said second light emitter connected in parallel with said first light emitter operative when the applied power exceeds said second power threshold; and
(d) means to combine for projection from said lighting device said first and said second spectral colors to form a third spectral color for projection; and
(e) means for viewing the combined light emissions and the change of color as said electrical power falls in the region between said first and said second thresholds for light emission.

16. A lighting device with a monitor for the condition of batteries and line supplies of electrical power as recited in claim 15 which further comprises:
(a) a light emitting diode operative at a first spectral color representing said first light emitter.

(b) an incandescent lamp with an optical filter operative at a second spectral color representing said second light emitter.

17. A lighting device with a monitor for the condition of batteries and line supplies of electrical power as recited in claim 15, wherein said light emitters comprise:
   (a) a diode for emitting illumination with a reddish color in the visible spectrum for said first color, responsive to applied power above said first threshold; and
   (b) a diode for emitting illumination with a greenish color in the visible spectrum for said second color, responsive to applied power above said second threshold.

18. A lighting device, for illumination and color perception supplied with electrical power, for efficiency and extended operation at low power levels, which comprises:
   (a) at least one series electrical circuit for dividing the available supplied power among the elements connected therein, which comprises:
      a first light emitter, operative at applied power exceeding a first threshold for light emission of a first color;
      a second light emitter, operative at applied power exceeding a second threshold for light emission of a second color, said second threshold different from said first threshold;
      a means to combine for projecting from said lighting device the light energies emitted from said first and second emitters.
      a means for automatic proportionment of said available power upon each of said emitters of the series circuit for effecting continued combined light emission over an extended range of said available power.

19. A lighting device, for illumination and color perception supplied with electrical power, for efficiency and extended operation at low power levels, as recited in claim 18, wherein said means for automatic proportionment of powers upon elements of said series circuit comprises:
   (a) a variation of the respective characteristic impedances of said emitters; and
   (b) the dissimilar thresholds for light emission of said emitters.

20. A lighting device, for illumination and color perception supplied with electrical power, for efficiency and extended operation at low power levels, as recited in claim 18, wherein said elements of said series electrical circuit, further comprise:
   (a) a light emitting diode as said first light emitter responsive to said applied power exceeding said first threshold for light emission.

21. A lighting device, for illumination and color perception supplied with electrical power, for efficiency and extended operation at low power levels, as recited in claim 20, wherein said elements of said series electrical circuit still further comprise:
   (a) an incandescent lamp, as said second light emitter for light emission in a broad spectrum of visible wavelengths, which has a filament resistance that serves as a protective current limiting element for said light emitting diode, said filament resistance characteristic being variable as a function of the power consumed by said incandescent lamp to effect at low power levels, increases in the relative percentage of said power consumed by said light emitting diode for its continued emission of light.

22. A lighting device, supplied by an alternating current power source, for the illumination and color perception of external surfaces, which comprises:
   (a) a group of light emitting diode solid state junctions for the emission by each said junction specific colors of the visible energy spectrum;
   (b) a circuit connection of said light emitting diode junctions in back-to-back polarity for bi-color emission of light on the full waveform of said alternating current power source; and
   (c) means for synthesizing a composite beam of illumination of a shaped energy profile of spectral wavelengths for illumination of said external surfaces.

23. A lighting device, supplied by an alternating current power source, for the illumination of external surfaces, as recited in claim 22, further comprising:
   (a) an incandescent lamp supplementing the respective emissions and acting as a current limiting resistor of said light emitting diode junction.

24. A lighting device, supplied by an alternating current power source, for the illumination of external surfaces, as recited in claim 22, further comprising:
   (a) at least one translucent envelope for containing at least some of said group of light emitting solid state junctions; and
   (b) an exit aperture of said lighting device for the projection of said composite beam of illumination upon said external surfaces.

25. A lighting device supplied by an alternating current power source as recited in claim 22 wherein the means for synthesizing the composite beam of illumination comprises:
   a power source which oscillates fast enough to permit the human eye to perceive a single color composite of the bi-color emissions.

* * * * *